(12) United States Patent
Yasuda et al.

(10) Patent No.: US 8,156,841 B2
(45) Date of Patent: Apr. 17, 2012

(54) MANIPULATION LEVER CONNECTION STRUCTURE OF VEHICLE

(75) Inventors: Kazuhiro Yasuda, Saitama (JP); Koji Sato, Saitama (JP); Hideo Yanai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1190 days.

(21) Appl. No.: 11/976,700

(22) Filed: Oct. 26, 2007

(65) Prior Publication Data

US 2008/0099302 A1 May 1, 2008

(30) Foreign Application Priority Data

Oct. 31, 2006 (JP) ................................. 2006-296538

(51) Int. Cl.
*F16C 1/10* (2006.01)
*G05G 1/04* (2006.01)
*B60K 20/00* (2006.01)

(52) U.S. Cl. .......... 74/502.2; 74/488; 74/489; 74/500.5; 74/501.5 R; 74/523; 74/473.21; 74/473.23

(58) Field of Classification Search ............ 74/501.5 R, 74/502.4, 502.6, 502.2, 523, 473.21, 473.23, 74/488, 489; 192/99 S
See application file for complete search history.

(56) References Cited

U.S. PATENT DOCUMENTS

| 4,334,438 | A | * | 6/1982 | Mochida | ....................... 74/502.4 |
| 4,833,937 | A | * | 5/1989 | Nagano | ..................... 74/501.5 R |
| 4,977,789 | A | * | 12/1990 | Osborn | ....................... 74/473.23 |
| 5,713,243 | A | * | 2/1998 | Williams et al. | ........... 74/473.21 |
| 6,405,613 | B1 | * | 6/2002 | Lim | ............................. 74/502.4 |
| 7,083,035 | B2 | * | 8/2006 | Noguchi et al. | ............. 192/99 S |
| 2007/0068328 | A1 | * | 3/2007 | Suzuki | ............................ 74/523 |

FOREIGN PATENT DOCUMENTS

| JP | 58-170225 | U | 5/1982 |
| JP | 01-120226 | U | 8/1989 |
| JP | 08-338442 | A | 12/1996 |
| JP | 2005-207490 | A | 8/2005 |
| JP | 2007-091190 | A | 4/2007 |

OTHER PUBLICATIONS

STIC PTO Machine Translation JP 8-338442, Isao, Dec. 24, 1996.*
STIC PTO Machine Translation JP 2005-207490, Hironori, Aug. 4, 2005.*
STIC, PTO Machine Translation JP 8-338442, Isao, Dec. 24, 1996.*
PTO STIC Translation of JP 19890815, Seiichi Nakano et al., Pub. Date Aug. 15, 1989.*

* cited by examiner

*Primary Examiner* — Vinh T. Luong
(74) *Attorney, Agent, or Firm* — Birch, Stewart, Kolasch & Birch, LLP

(57) ABSTRACT

A manipulation lever connection structure for a vehicle eliminates a striking sound without losing an adjusting function of an adjustment nut. The manipulation lever connection structure for a vehicle includes an arm for operating a driving changeover device and for connecting a wire which extends from a manipulation lever to the arm. An adjustment bolt is mounted on a distal end of the wire with a joint slidably mounted on the adjustment bolt on an axis thereof. An adjustment nut for supporting the joint is fastened to the adjustment bolt. A pair of side plate portions, respectively, forming elongated holes which allow the joint to pass therethrough is mounted on the arm. The adjustment nut is inserted between the pair of side plate portions with a buffer cover being mounted on the adjustment nut with a clearance formed between the adjustment nut and the respective side plate portions.

20 Claims, 12 Drawing Sheets

MANIPULATION LEVER CONNECTION STRUCTURE OF VEHICLE

CROSS-REFERENCE TO RELATED APPLICATIONS

The present application claims priority under 35 USC 119 to Japanese Patent Application No. 2006-296538 filed on Oct. 31, 2006 the entire contents of which are hereby incorporated by reference.

BACKGROUND OF THE INVENTION

1. Field of the Invention

The present invention relates to a manipulation lever connection structure of a vehicle for connecting a manipulation lever to a driving changeover device which can change over a driving state between two-wheel drive and four-wheel drive by way of a wire.

2. Description of Background Art

With respect to a conventional vehicle, a driving changeover device is known for changing over a driving state in response to a manipulation of a manipulation lever. With respect to this type of changeover device, a changeover device is known wherein the manipulation lever is connected to an arm of a driving changeover lever which operates the driving changeover device by way of a wire so as to enable a remote control of the changeover device using the manipulation lever. See, for example, JP-UM-A-58(1983)-170225. In JP-UM-A-58(1983)-170225, there exists a possibility that the manipulation wire does not return temporarily so that a portion of a long wire is deflected. Under such a circumstance, it is necessary to ensure a gap to prevent the interference of the wire with other parts or the like. Accordingly, to prevent the wire from being deflected at a middle portion thereof by enhancing the return of the wire, there has been proposed a mechanism having the following structure. An elongated hole is formed in an arm of a driving changeover lever, a joint is fitted into the elongated hole with an adjustment bolt which penetrates the joint. A wire extends from a manipulation lever and is connected to the adjustment bolt with an adjustment nut which supports the joint being mounted on the adjustment bolt. Due to such a structure, by rotating the arm of the driving changeover lever by way of the adjustment bolt and the joint with the wire manipulation, a support shaft of the driving changeover device which is connected to the arm becomes rotatable. See, Japanese Patent Application No. 2005-314998.

However, in the driving changeover device which changes a driving state between two-wheel drive and four-wheel drive, the driving changeover is performed based on a rotational position of the support shaft without being based on the tension of the wire. Thus, a space which expands in the tension direction of the wire is formed between the joint which is connected with the wire and a hole wall of the elongated hole formed in the arm. Accordingly, the position of the adjustment nut which supports the joint is not restricted in the thrust direction. Thus, when the adjustment nut vibrates due to vibrations of a vehicle body or the like, there exists a possibility that the adjustment nut and the arm come into contact with each other thus generating a striking sound.

SUMMARY AND OBJECTS OF THE INVENTION

The invention has been made under such circumstances. It is an object of an embodiment of the invention to provide the manipulation lever connection structure of a vehicle which can eliminate a striking sound without losing an adjusting function using an adjustment nut.

To achieve the above-mentioned object, an embodiment of the invention is directed to a manipulation lever connection structure of a vehicle which includes an arm for operating a driving changeover device for connecting a wire which extends from a manipulation lever to the arm. An adjustment bolt is mounted on a distal end of the wire, a joint is slidably mounted on the adjustment bolt on an axis of the adjustment bolt, and an adjustment nut which supports the joint is fastened to the adjustment bolt. A pair of joint support plate portions, respectively, form openings having an elongated hole shape which allow the joint to pass therethrough. The pair of joint support plate portions is mounted on the arm, and the adjustment nut is inserted between the pair of joint support plate portions, and an impact buffer member being mounted on the adjustment nut with a clearance formed between the adjustment nut and the respective joint support plate portions.

According to an embodiment of the invention, it is possible to suppress the generation of a striking sound by the impact buffer member even when the adjustment nut vibrates due to vibrations of a vehicle body while enabling the adjustment of a position of the joint by the adjustment nut and avoiding a friction loss between the adjustment nut and the arm.

In such a construction, it is also preferable that a head portion of the adjustment nut has a hexagonal shape, a shaft portion of the adjustment nut is formed into a cylindrical shape having a diameter smaller than the diameter of the head portion of the adjustment nut, and the impact buffer member is mounted on the shaft portion. Due to such a construction, the head portion of the adjustment nut can have a hexagonal shape having the diameter larger than a diameter of the shaft portion. Thus, the fastening quantity of the adjustment nut can be easily adjusted and, at the same time, the removal of the impact buffer member mounted on the shaft portion can be prevented.

According to an embodiment of the invention, the manipulation lever connection structure of the vehicle includes the arm for operating the driving changeover device and for connecting the wire which extends from the manipulation lever to the arm. The adjustment bolt is mounted on the distal end of the wire, the joint is slidably mounted on the adjustment bolt on the axis of the adjustment bolt, and the adjustment nut which supports the joint is fastened to the adjustment bolt, the pair of joint support plate portions which respectively form the openings, having an elongated hole shape which allow the joint to pass therethrough, are mounted on the arm, and the adjustment nut is inserted between the pair of the joint support plate portions, and the impact buffer member is mounted on the adjustment nut with the clearance formed between the adjustment nut and the respective joint support plate portions. Accordingly, it is possible to eliminate a striking sound when the adjustment nut vibrates due to vibrations of the vehicle body without losing the adjusting function using the adjustment nut.

Further, the head portion of the adjustment nut has a hexagonal shape, the shaft portion of the adjustment nut is formed into a cylindrical shape having a diameter smaller than the diameter of the head portion, and the impact buffer member is mounted on the shaft portion. Thus, a fastening quantity of the adjustment nut can be easily adjusted and, at the same time, the removal of the impact buffer member can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
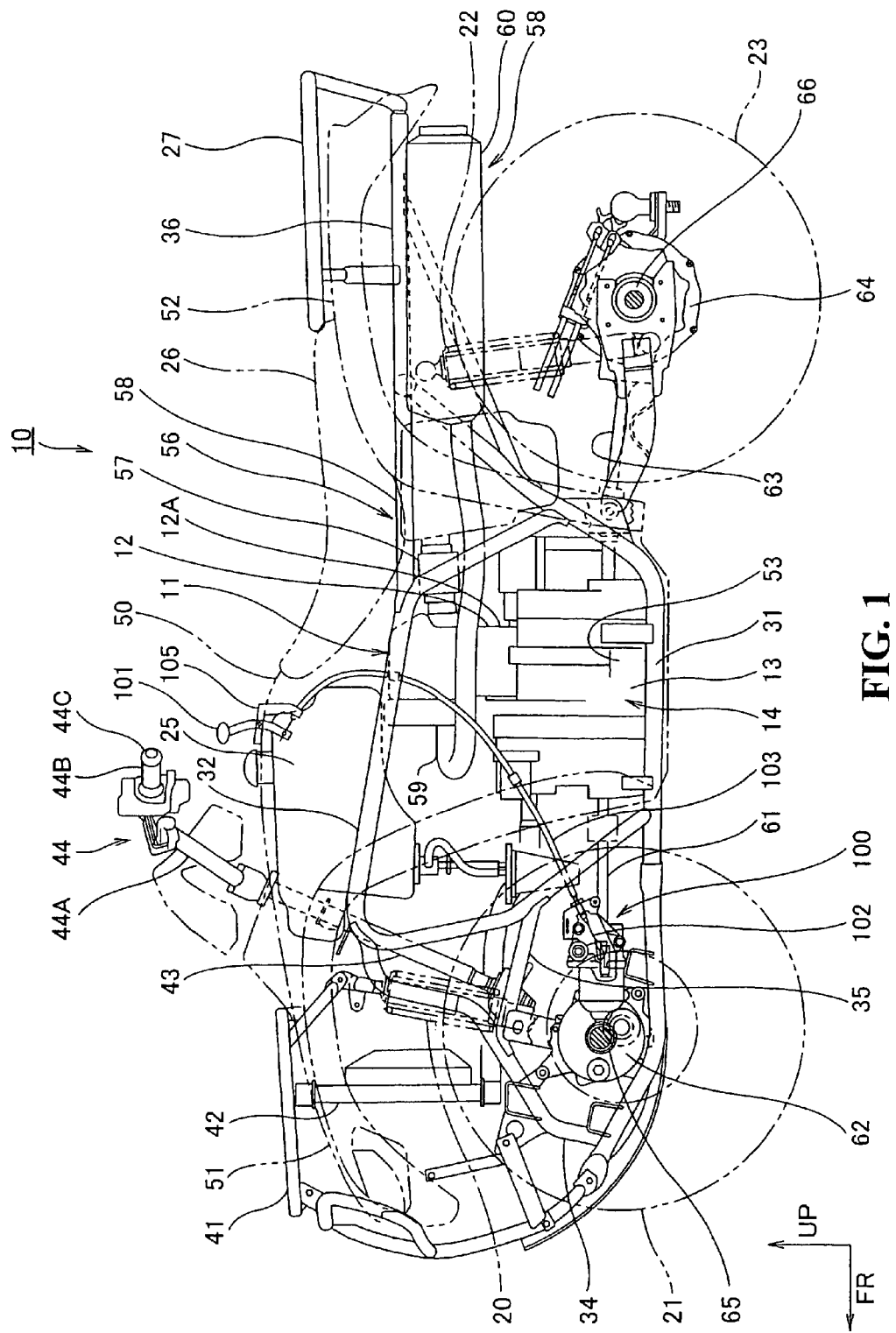
FIG. 1 is a side view of a vehicle to which a manipulation lever connection structure according to the invention is applied.

Hereinafter, one embodiment of the invention is explained in conjunction with the attached drawings. Here, in the explanation, the directions such as front and rear, left and right directions, and upper and lower directions are directions with respect to the directions of a vehicle body. Further, in the drawing, an arrow FR indicates a front side of the vehicle, and an arrow UP indicates an upper side of the vehicle body, respectively.

FIG. 1 is a side view of a vehicle 10 according to an embodiment of the invention. The vehicle 10 is a four-wheeled vehicle which is classified as an ATV suitable for traveling on a rough terrain (All Terrain Vehicle). Left and right front wheels 21, 21 (only front wheel 21 on a viewer's side shown is in FIG. 1) are respectively suspended from a front portion of a vehicle body frame 11 by way of a pair of left and right front shock absorbers 20, 20 (only shock absorber 20 on a viewer's side is shown in FIG. 1). Left and right rear wheels 23, 23 (only rear wheel 23 on a viewer's side is shown in FIG. 1) are also respectively suspended from a rear portion of the vehicle body frame 11 by way of a pair of left and right rear shock absorbers 22, 22 (only rear shock absorber 22 on a viewer's is side shown in FIG. 1). Further, a power unit 14 including an engine 12 and a transmission 13 is arranged on an approximate center portion of the vehicle body frame 11.

The vehicle body frame 11 includes a pair of left and right lower frames 31, 31 (only lower frame 31 on a viewer's side is shown in FIG. 1) for supporting a lower portion of the power unit 14. A pair of left and right upper frames 32, 32 (only upper frame 32 on a viewer's side is shown in FIG. 1) are provided which has an approximately U shape and is arranged on upper portions of the lower frames 31, 31 in a state wherein the upper frames 32, 32 surround the power unit 14 as viewed in a side view. A pair of left and right front frames 34, 34 (only front frame 34 on a viewer's side is shown in FIG. 1) respectively join front upper portions of the upper frames 32, 32 and front end portions of the lower frames 31, 31.

The vehicle body frame 11 also includes a pair of left and right front connection frames 35, 35 (only front connection frame 35 on a viewer's side is shown in FIG. 1) for respectively connecting the front frames 34, 34 and the upper frames 32, 32 and a pair of left and right rear upper frames 36, 36 (only rear upper frame 36 on a viewer's side shown in FIG. 1) which extend rearwardly from rear upper portions of the upper frames 32, 32 and, at the same time, includes intermediate portions thereof connected to rear ends of the lower frames 31, 31.

A front carrier 41 and an engine-cooling radiator 42 are mounted on a front portion of the vehicle body frame 11 with a steering shaft 43 being rotatably arranged behind the front carrier 41 and the engine-cooling radiator 42. The steering shaft 43 is rotatably supported on a cross pipe not shown in the drawing which extends between the upper frames 32, 32 and is steerably connected to the front wheels 21, 21. The front wheels 21, 21 can be steerably manipulated by a handle 44 which is mounted on an upper portion of the steering shaft 43.

Further, a fuel tank 25 and a saddle-type seat 26 are arranged on a center upper portion of the vehicle body frame 11 with a rear carrier 27 being arranged on a rear portion of the vehicle body frame 11. Further, the approximately whole vehicle body is covered with a resin-made vehicle body cover 50. The front wheels 21, 21 are covered with resin-made front fenders 51, 51, the rear wheels 23, 23 are covered with resin-made rear fenders 52, 52, and a step floor 53 mounted on the vehicle body frame 11 is arranged on a center lower portion of the vehicle body.

A water-cooled engine is adopted as the engine 12 of the power unit 14, and an intake device 55 and an exhaust device 56 are connected to a cylinder portion 12A of the engine 12. The intake device 55 includes a throttle body 57, which is connected to a rear portion of the cylinder portion 12A, with an air cleaner 58, which is connected to a rear portion of the throttle body 57, for mixing fuel into air which is purified by the air cleaner 58 and for supplying the air-fuel mixture to the engine 12.

Further, the exhaust device 56 includes an exhaust pipe 59 which extends rearwardly from a front side of the cylinder portion 12A along a side of the cylinder portion 12A with a muffler 60 which is mounted on an end portion of the exhaust pipe 59 and for discharging a gas discharged from the engine 12 while quieting a sound using the muffler 60.

The vehicle 10 adopts a four-wheel driving method for driving the front wheels 21, 21 and the rear wheels 23, 23 using power of the power unit 14. A power transmission mechanism for transmitting power from the power unit 14 to the front wheels 21, 21 and the rear wheels 23, 23 includes a front propeller shaft 61 which extends frontwardly from a lower portion of the power unit 14, a front final assembly 62 which is connected to a distal end of the front propeller shaft 61. A rear propeller shaft 63 extends rearwardly from the lower portion of the power unit 14, and a rear final assembly 64 is connected to a rear end of the rear propeller shaft 63.

The left and right front wheels 21, 21 are connected to the front final assembly 62 by way of a pair of left and right front drive shafts 65, 65 (only front drive shaft 65 on a viewer's side is shown in FIG. 1). The front final assembly 62 transmits a rotational force of the front propeller shaft 61 which is rotatably driven by the power of the power unit 14 to the front wheels 21, 21.

Further, the left and right rear wheels 23, 23 are connected to the rear final assembly 64 by way of a pair of left and right rear drive shafts 66, 66 (only rear drive shaft 66 on a viewer's side is shown in FIG. 1), and the rear final assembly 64 transmits a rotational force of the rear propeller shaft 63 which is rotatably driven by the power of the power unit 14 to the rear wheels 23, 23.

Figure 2:
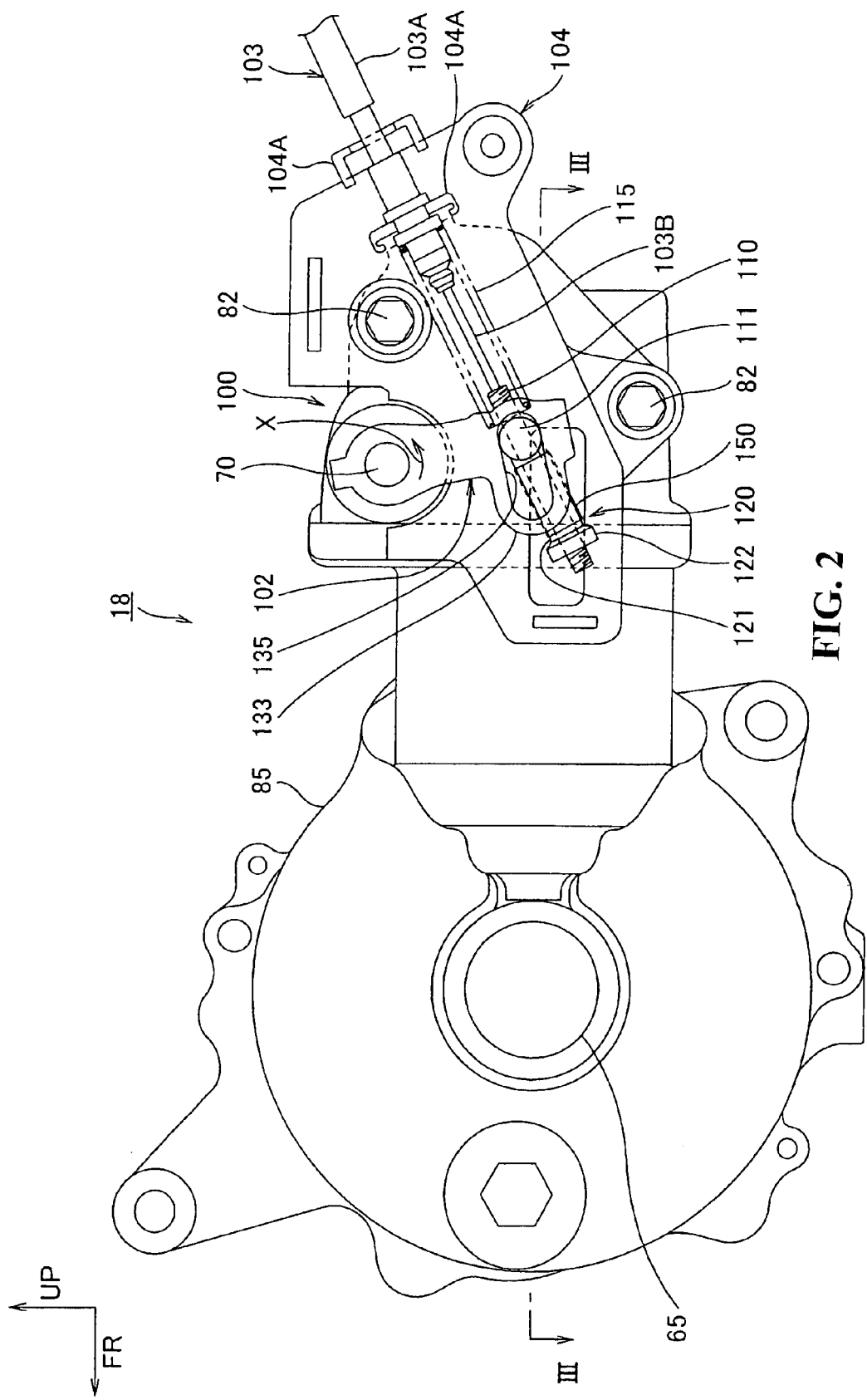
FIG. 2 is a view showing a front final assembly together with the construction around the front final assembly.
Figure 3:
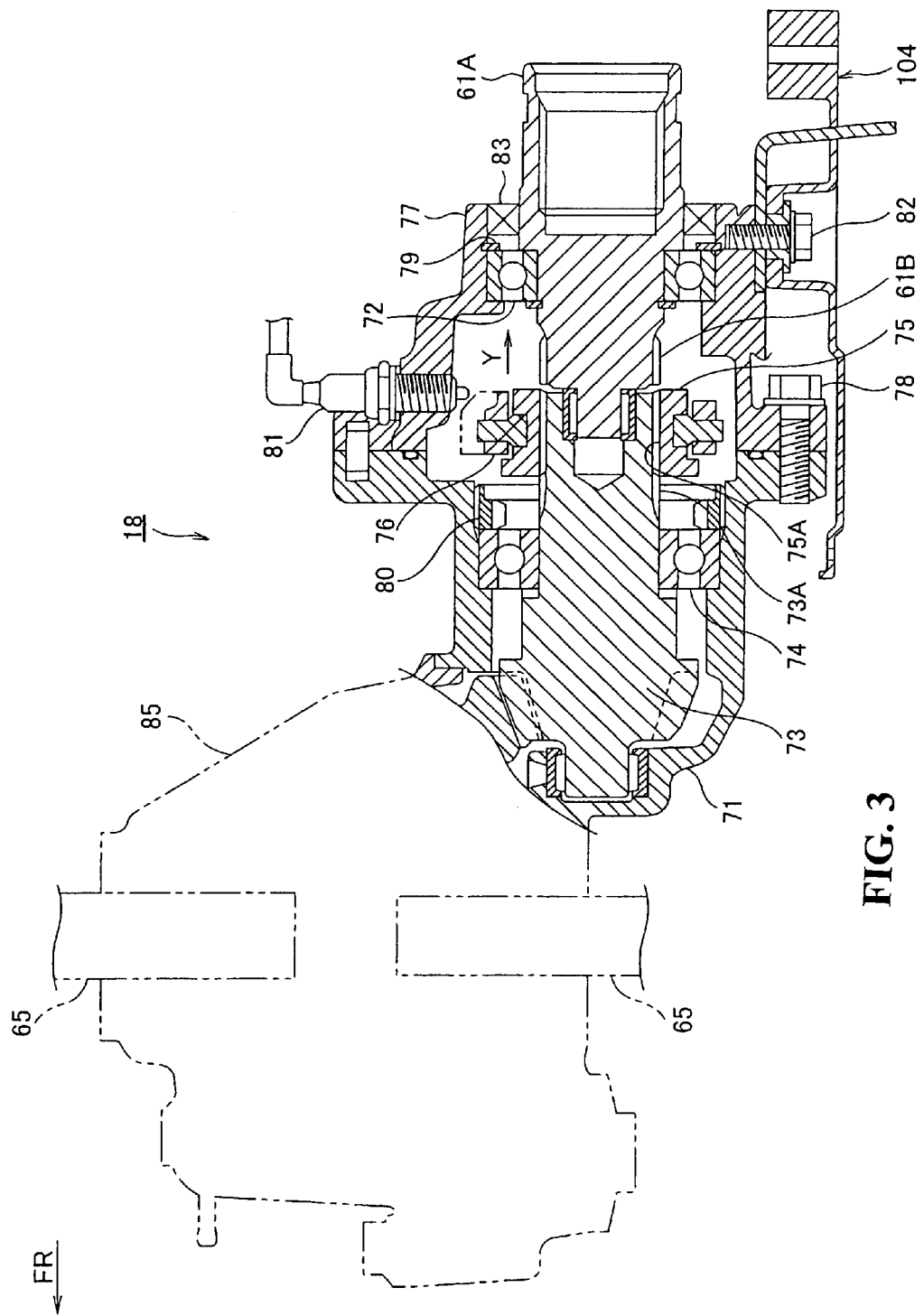
FIG. 3 is a cross-sectional view taken along a line III-III in FIG. 2.

FIG. 2 is a view showing the front final assembly 62 together with the construction around the front final assembly 62, and FIG. 3 is a cross-sectional view taken along a line III-III in FIG. 2.

The front final assembly 62 is configured such that the front final assembly 62 includes a clutch shaft (support shaft) 70 projecting from a side of the assembly 62, and the transmission of power from the front propeller shaft 61 to the front drive shafts 65, 65 can be cut off by rotating the clutch shaft 70.

To be more specific, the front final assembly 62 includes a housing body 71 and a housing cover 77, and a distal end portion 61A of the front propeller shaft 61 is rotatably supported on the housing cover 77 by way of a bearing 72. A drive pinion gear 73 is relatively rotatably connected to the distal end portion 61A, and the drive pinion gear 73 is supported on the housing body 71 by way of a bearing 74. A spline 73A is formed in an outer periphery of the drive pinion gear 73, and a spline 75A formed in an inner periphery of a joint sleeve 75 engages the spline 73A.

The joint sleeve 75 moves in the axial direction to allow the spline 75A of the joint sleeve 75 to engage a spline 61B formed in an outer periphery of the distal end portion 61A. A fork 76 engages the joint sleeve 75, while the fork 76 is connected to the clutch shaft 70 (see FIG. 2) which is pivotally supported on the front final assembly 62. Upon rotation of the clutch shaft 70 in the direction indicated by an arrow X shown in FIG. 2, the fork 76 moves in the direction indicated by an arrow Y in FIG. 3 and shifts the joint sleeve 75 in the axial direction. In a state shown in FIG. 3, the joint sleeve 75 is positioned on a drive-pinion gear 73 side to disengage the connection between the front propeller shaft 61 and the drive pinion gear 73. When the joint sleeve 75 moves in the direction indicated by the arrow Y from a state shown in FIG. 3, the spline 75A formed in the inner periphery of the joint sleeve 75 engages the spline 73A formed in the outer periphery of the drive pinion gear 73 and the spline 61B formed in the outer periphery of the distal end portion 61A, respectively. Thus, the front propeller shaft 61 and the drive pinion gear 73 are connected with each other.

Bolts 78 connect the housing body 71 and the housing cover 77 to each other with a retainer ring 79 for fixing the bearing 72 to the housing cover 77. A locknut 80 is provided for fixing the bearing 74 to the housing body 71. A position detection switch 81 detects a position of the joint sleeve 75. A bolt 82 connects a support plate 104 which is described later to the housing cover 77. An oil seal 83 is provided. Further, a final speed reduction gear 85 is connected to the drive pinion gear 73. The final speed reduction gear 85 incorporates a differential mechanism for absorbing the rotation difference between the front drive shafts 65, 65 therein.

Due to the above-mentioned construction, when the front propeller shaft 61 and the drive pinion gear 73 are connected to each other, the driving force of the power unit 14 is transmitted to the front wheels 21, 21 thus enabling four-wheel driving of the vehicle 10. When the connection between the front propeller shaft 61 and the drive pinion gear 73 is released, the driving force of the power unit 14 is not transmitted to the front wheels 21, 21 thus enabling two-wheel driving (rear-wheel driving) of the vehicle 10.

The vehicle 10 according to the embodiment includes a driving changeover device 100 for changing over a driving state between four-wheel driving and two-wheel driving by rotating the clutch shaft 70 of the front final assembly 62 with the manual operation of a driver.

Figure 4:
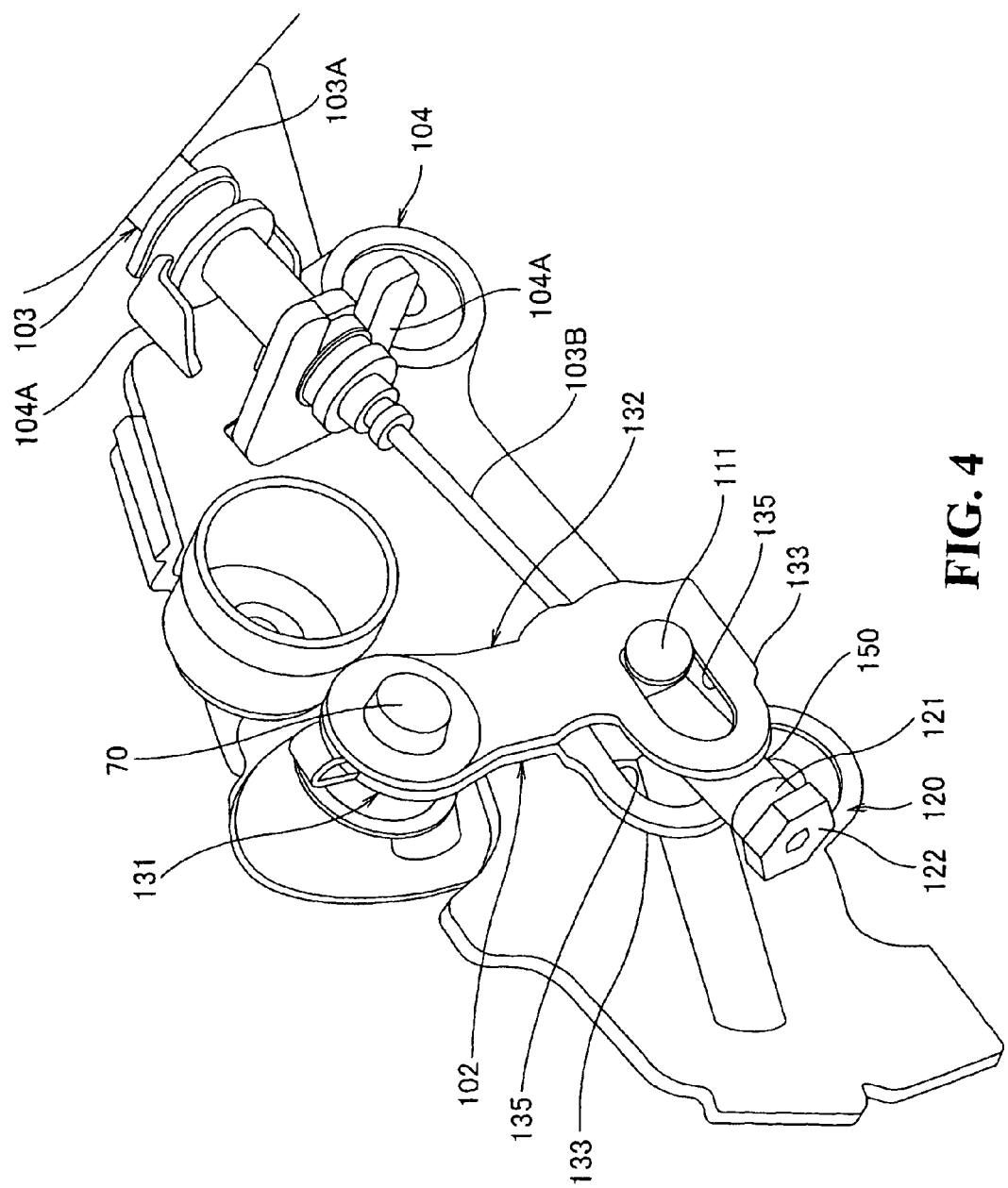
FIG. 4 is a perspective view showing a driving changeover device.

As shown in FIGS. 2 and 4, the driving changeover device 100 includes a manipulation lever 101 (see FIG. 1) which is manipulated by a manipulator, a driving changeover lever 102 which is connected to the clutch shaft 70 of the front final assembly 62, a wire 103 which connects the manipulation lever 101 and the driving changeover lever 102. A support plate 104 is fixed to the front final assembly 62 and supports the wire 103.

As shown in FIG. 1, the manipulation lever 101 is arranged in the vicinity of the fuel tank 25 so as to allow a the driver to manipulate the manipulation lever 101 in a state wherein the driver sits on the seat 26. To be more specific, the manipulation lever 101 is tiltably supported on a lever support bracket 105 which is arranged in the vicinity of the fuel tank 25.

The wire 103 which extends from the manipulation lever 101 is connected to the driving changeover lever 102 along a side of the power unit 14. The wire 103 includes an outer tube 103A and an inner wire 103B which is movably inserted into the inside of the outer tube 103A. One end of the outer tube 103A engages the above-mentioned lever support bracket 105, and another end of the outer tube 103A engages the engaging portions 104A, 104A formed on the support plate 104.

The inner wire 103B has one end thereof connected to the manipulation lever 101 and, at the same time, has another end thereof connected to the driving changeover lever 102.

Here, as shown in FIG. 2, an adjustment bolt 110 is mounted on a distal end of the inner wire 103B on another end side (driving changeover lever 102 side), and a joint 111 having an approximately columnar shape is mounted on the adjustment bolt 110 in a state wherein the joint 111 is slidable on an axis of the adjustment bolt 110. Thereafter, an adjustment nut 120 is fastened to the adjustment bolt 110 so as to position the joint 111. More specifically, the position of the joint 111 can be adjusted by adjusting a fastening quantity of the adjustment nut 120.

The joint 111 is a part which functions as a connecting member for connecting the inner wire 103B and the driving changeover lever 102. A return spring 115, formed of a compression coil spring, is arranged between the joint 111 and the above-mentioned engaging portion 104A formed on the support plate 104. The return spring 115 is arranged between an end portion of the outer tube 103A which engages the engaging portion 104A of the support plate 104 and the joint 111. In a state shown in FIG. 2, the return spring 115 is in a compressed state thus generating a resilient force which acts to pull out the inner wire 103B from the outer tube 103A. In FIG. 4, the return spring 115 is omitted from the drawing.

Figure 5:
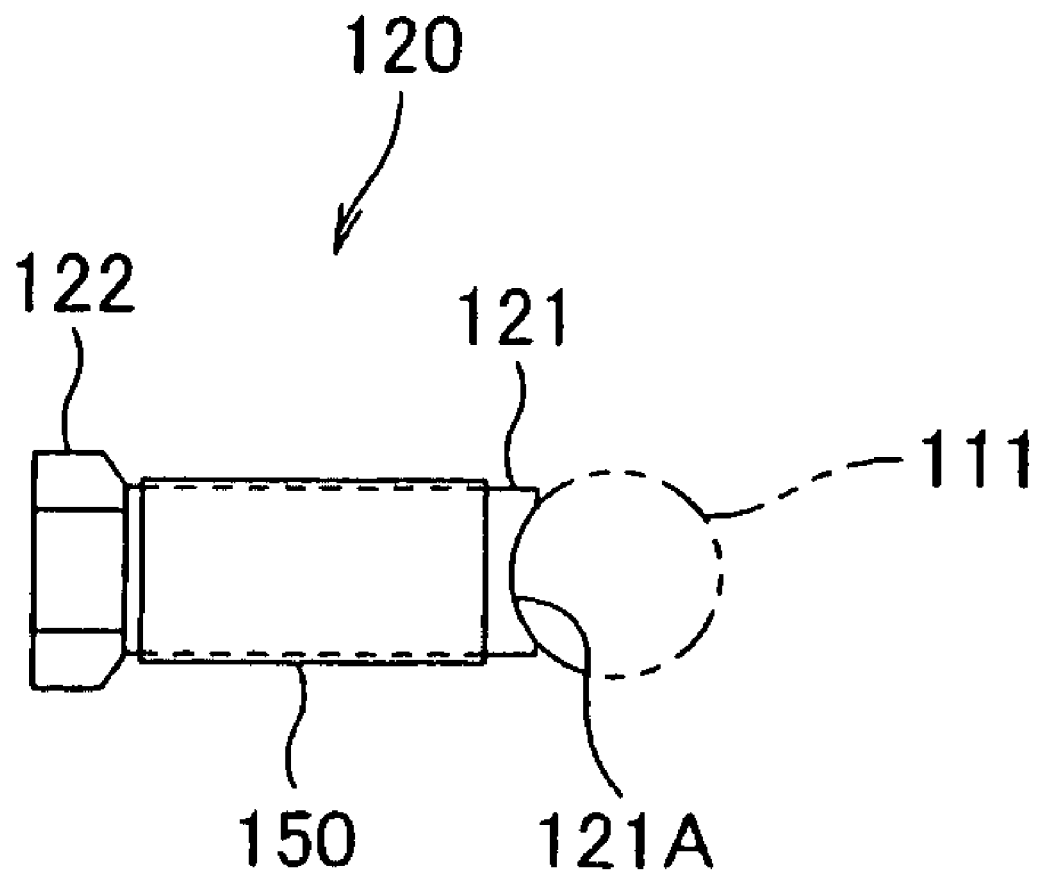
FIG. 5 is a view showing an adjustment nut.

The adjustment nut 120 integrally includes, as shown in FIG. 5, a cylindrical shaft portion 121 in which a screw hole is formed and a hexagonal nut portion 122 which is integrally formed with the shaft portion 121 and constitutes a head portion of the adjustment nut 120. Using such a nut portion 122, it is possible to easily fasten the adjustment nut 120 to the adjustment bolt 110. Further, a cut-out portion 121A is formed on another end of the shaft portion 121 along a peripheral surface of the joint 111. By engaging the joint 111 with the cut-out portion 121A, it is possible to prevent the positional displacement of the joint 111.

Figure 6A:
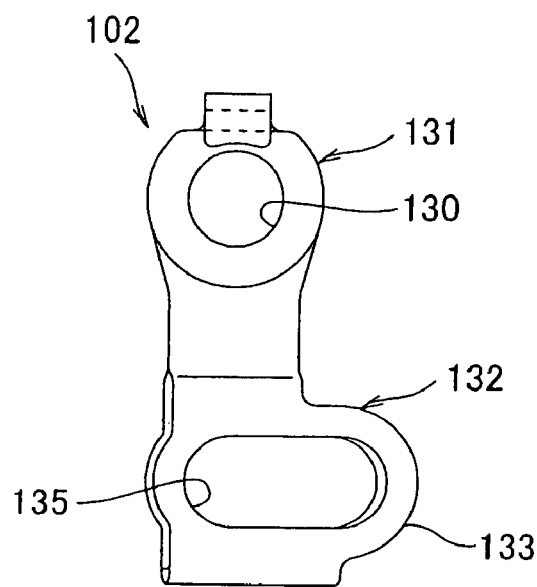
FIG. 6(a) is a plan view of a driving changeover lever.
Figure 6B:
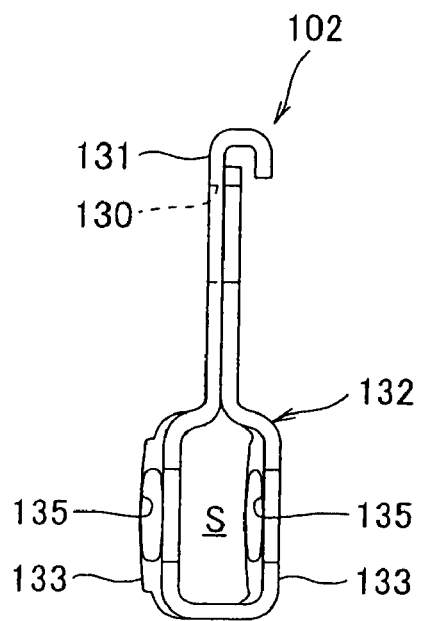
FIG. 6(b) is a view of the driving changeover lever as viewed from a side.

The driving changeover lever 102 is, as shown in FIGS. 6(a) and 6(b), formed by bending one sheet of plate material and includes a shaft joint portion 131 having a hole portion 130 which is joined to the above-mentioned clutch shaft 70 and an arm 132 which extends from the shaft joint portion 131. Thereafter, the driving changeover lever 102 is bent in an approximately rectangular shape to form a space S through which the adjustment bolt 110 and the inner wire 103B pass.

In the arm 132, elongated holes 135, 135 are respectively formed in a pair of left and right side plate portions (joint support plate portions) 133, 133 which constitute left and right side surfaces of the arm 132, and the joint 111 passes through the pair of left and right elongated holes 135, 135 (openings having an elongated hole shape) so as to connect the inner wire 103B and the drive changeover lever 102 to each other.

Figure 7:
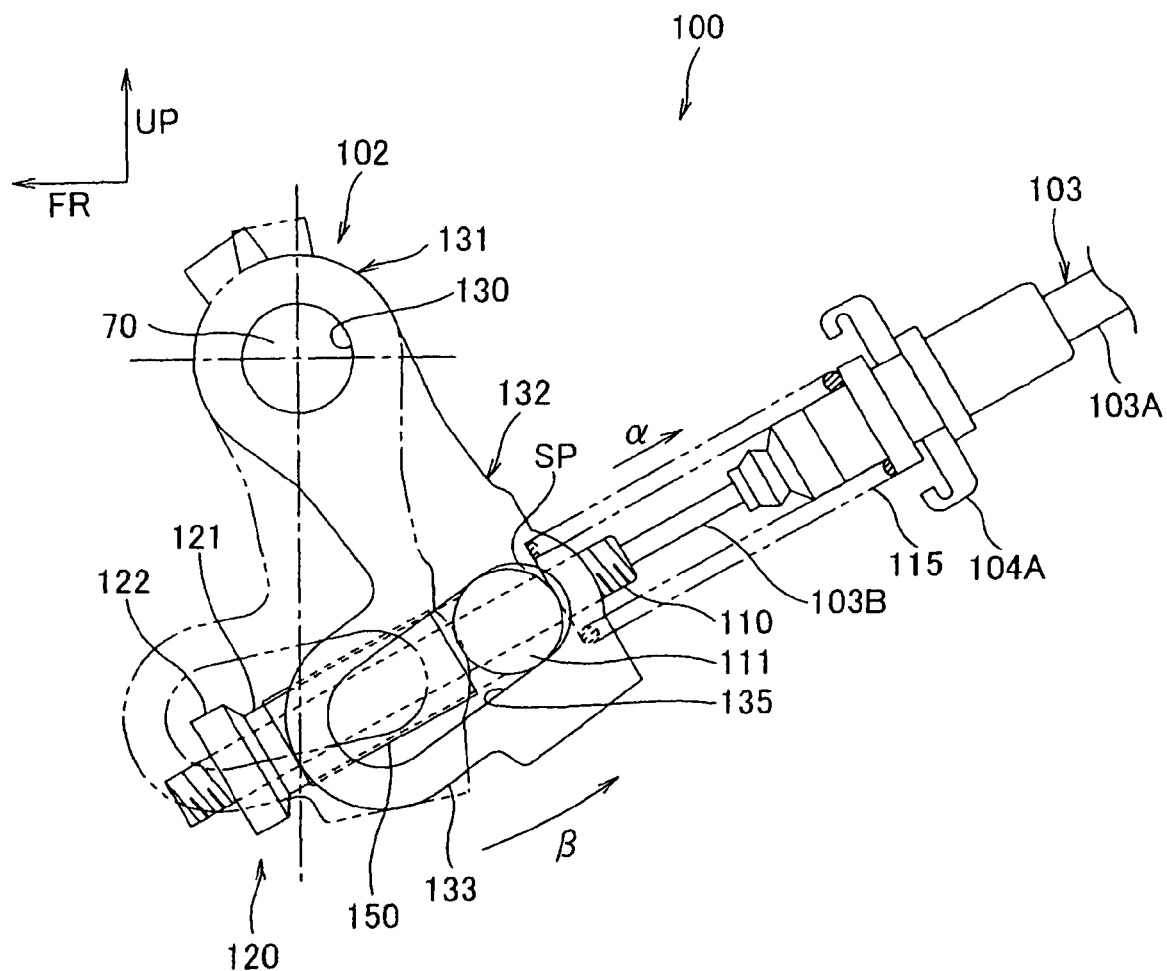
FIG. 7 is a view for explaining the manner of operation of the driving changeover device.

The pair of left and right elongated holes 135, 135 is, as shown in FIG. 7, formed into an elongated hole which extends along substantially in the direction that the joint 111 and the inner wire 103B which pass through these elongated holes 135, 135 extend and is retracted in a state wherein the driving changeover lever 102 is mounted on the clutch shaft 70.

In this manner, by forming the elongated holes 135, 135 in the arm 132 of the driving changeover lever 102, in returning the inner wire 103B by manipulating the manipulation lever 101, the inner wire 103B can easily return. Accordingly, an excessive undesired force does not act on the inner wire 103B. Thus, it is possible to prevent the inner wire 103B from being deflected at a middle portion thereof. In other word, with the provision of the elongated holes 135, 135 which enhance the return of the inner wire 103B, it is possible to avoid the deflection of the inner wire 103B.

Figure 6C:
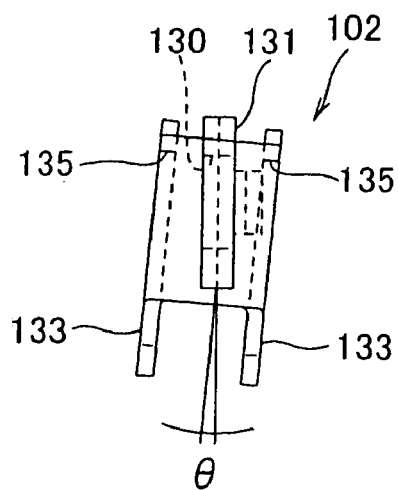
FIG. 6(c) is a view of the driving changeover lever as viewed from below.

Further, the pair of left and right side plate portions 133, 133 is, as shown in FIG. 6(c), formed to be approximately parallel to each other at an inclined angle θ with respect to the shaft joint portion 131 of the driving changeover lever 102. The angle θ is set such that, when the wire 103 extends from the manipulation lever 101 manipulated by the driver is gently bent and pulled around, the direction along which a distal end of the wire 103 extends. Thus, the pair of left and right side plate portions 133, 133 become approximately parallel to each other. Due to such a construction, it is possible to avoid interference between the inner wire 103B and the pair of left and right side plate portions 133, 133 and, at the same time, it is possible to avoid a sharp bending of the wire 103.

FIG. 7 is a view explaining the manner of operation of the driving changeover device 100. In FIG. 7, an initial position of the driving changeover lever 102 is indicated by a chain double-dashed line.

When the driver pulls the inner wire 103B as indicated by an arrow α in FIG. 7 by manipulating the manipulation lever 101, the joint 111 pulls the driving changeover lever 102 by way of the adjustment bolt 110 which is mounted on the inner wire 103B and the adjustment nut 120. Accordingly, the driving changeover lever 102 is rotated in the direction indicated by an arrow β integrally with the clutch shaft 70. Thus, along with the movement of the joint 111, the return spring 115 is compressed.

When the driving changeover lever 102 is rotated, the fork 76 shown in FIG. 3 moves in the direction indicated by an arrow Y to shift the joint sleeve 75 in the axial direction.

Due to such an operation, the joint sleeve 75 engages both the front propeller shaft 61 and the drive pinion gear 73 by spline fitting thus connecting the front propeller shaft 61 and the drive pinion gear 73. Accordingly, the driving state of the vehicle 10 is changed over to four-wheel driving.

On the other hand, when the driver manipulates the manipulation lever 101 in the direction opposite to the above-mentioned direction, in the course of the transmission of the driving force from the front propeller shaft 61 to the drive pinion gear 73, when a friction between the joint sleeve 75 and the front propeller shaft 61 and the drive pinion gear 73 is large, the shifting of the joint sleeve 75 becomes difficult. Thus, although the driving changeover lever 102 is not rotated, due to a resilient force of the return spring 115, the joint 111 smoothly moves in the inside of the elongated holes 135, 135 formed in the driving changeover lever 102 without a constraint. Accordingly, the inner wire 103B smoothly returns in the inside of the outer tube 103A in response to a manipulation quantity of the manipulation lever 101. Thus, the free deflection of the wire 103 can be prevented.

In such a state, when the driving force which is transmitted from the front propeller shaft 61 to the drive pinion gear 73 is decreased or the driving force is eliminated, the friction between the joint sleeve 75 and the front propeller shaft 61 and the drive pinion gear 73 becomes small. Accordingly, due to a resilient force of a coil spring not shown in the drawing, the driving changeover lever 102 is rotated together with the clutch shaft 70 and returns to an original position. Thus, the connection between the front propeller shaft 61 and the drive pinion gear 73 is cut off whereby the driving state of the vehicle 10 is changed over to the two-wheel driving.

In this manner, by forming the above-mentioned elongated holes 135, 135 in the driving changeover lever 102, in returning the inner wire 103B by manipulating the manipulation lever 101, to be more specific, in returning the manipulation lever 101 for releasing the state in which the front wheels 21, 21 are driven (four-wheel driving), it is possible to prevent the wire 103 from being deflected in a midst portion thereof even when the driving changeover lever 102 does not return.

Here, in this embodiment, as shown in FIG. 7, by forming the clearance SP which opens in the stretching direction of the wire 103 between the joint 111 mounted on the wire 103 and the elongated holes 135, 135 formed in the arm 132 of the driving changeover lever 102, the position of the joint sleeve 75 can be accurately determined by means of the clutch 70 without depending on the stretching of the wire 103. Accordingly, the position of the adjustment nut 120 which is mounted on the distal end of the wire 103 is not restricted. Thus, there exists a possibility that the adjustment nut 120 vibrates due to vibrations of the vehicle body and comes into contact with the arm 132 thus generating a striking sound.

In this case, the striking sound may be avoided by eliminating the clearance CL between the adjustment nut 120 and the arm 132 thus constraining the adjustment nut 120 using the arm 132. However, a friction loss between the adjustment nut 120 and the arm 132 is large. Thus, the angle change traceability of the arm 132 with respect to the movement of the wire 103 at the time of changing over the driving state between the two-driving and the four-driving changeover is lost. Thus, there exists a possibility that the operation may become unstable or wear or the like may be generated.

Figure 8:
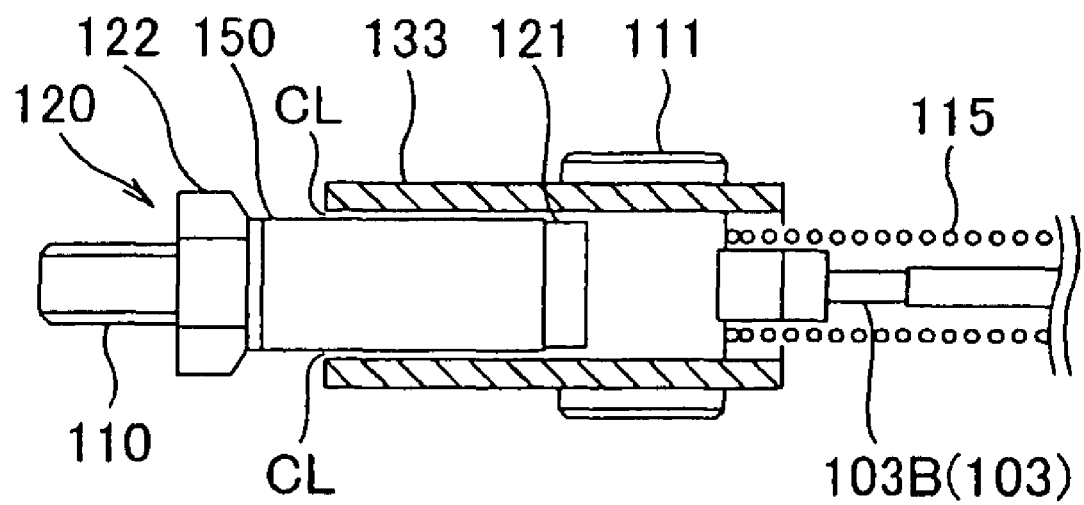
FIG. 8 is a view showing an arm and an adjustment nut of the driving changeover device together with the constitution around the arm and the adjustment nut.

Accordingly, in this embodiment, as shown in FIG. 8, on the shaft portion 121 of the adjustment nut 120, a buffer cover (impact buffer member) 150 formed of a vinyl tube is mounted. The buffer cover 150 is mounted so as to cover the substantially whole shaft portion 121 of the adjustment nut 120. Further, the buffer cover 150 is made of a thin material so as to form the clearance CL between a pair of left and right side plate portions 133, 133 of the arm 132.

Figure 9A:
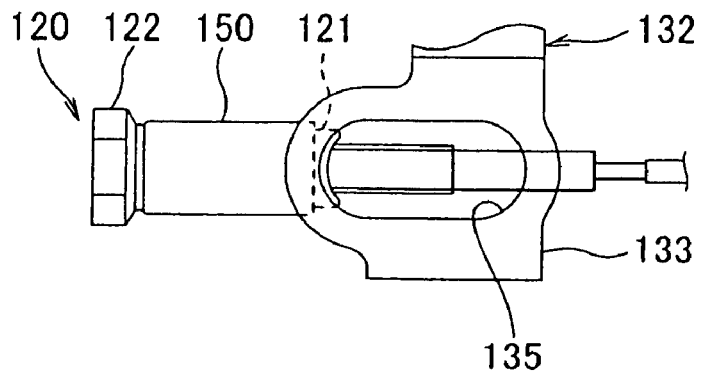
FIG. 9(a) is a view showing the adjustment nut when a wire is extended almost together with an arm.
Figure 9B:
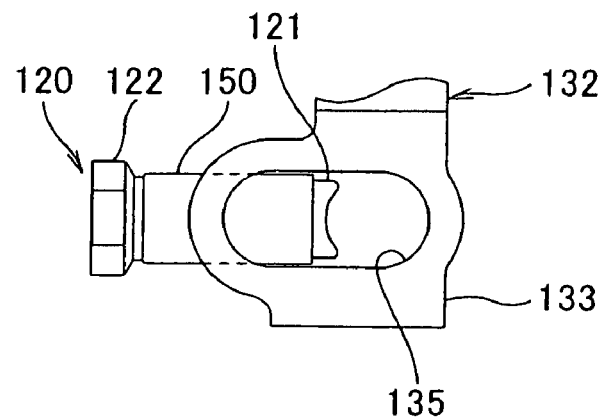
FIG. 9(b) is a view showing the adjustment nut when the wire is pulled almost together with the arm.

FIG. 9(a) is a view showing the adjustment nut 120 when the wire 103 extends almost together with the arm 132, while FIG. 9(b) is a view showing the adjustment nut 120 when the wire 103 is pulled almost together with the arm 132.

Figure 9C:
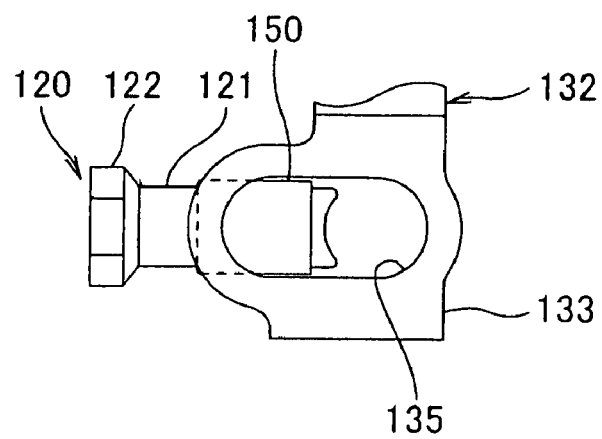
FIG. 9(c) is a view showing the buffer cover positioned inside the arm.

As shown in these drawings, the buffer cover 150 covers substantially the whole shaft portion 121 of the adjustment nut 120. Thus, a condition wherein the buffer cover 150 is positioned inside the arm 132, that is, inside the pair of left and right side plate portions 133, 133 of the arm 132 in the whole movable range of the adjustment nut 120 is satisfied. Here, provided that the above-mentioned condition is satisfied, as shown in FIG. 9(c), a short cover may be applied to the buffer cover 150.

Accordingly, when the adjustment nut 120 vibrates due to vibrations of the vehicle body or the like, the buffer cover 150 comes into contact with the arm 132 and attenuates an impact brought about by the vibrations. Thus, it is possible to suppress the generation of a striking sound. Further, the clearance CL is formed between the buffer cover 150 and the arm 132. Thus, there is no friction loss between the adjustment nut 120 and the arm 132. Thus, the manipulation lever connection structure of the vehicle can follow or trace an angle change of the arm 132 at the time of changing over the driving state between two-wheel driving and four wheel driving thus ensuring the performance of the two-wheel driving/four-wheel driving changeover.

In this case, metal contact between the adjustment nut 120 and the arm 132 is avoided. Thus, the wear of the adjustment nut 120 and the arm 132 can also be suppressed.

Further, since the buffer cover 150 is mounted on the shaft portion 121 of the adjustment nut 120, the buffer cover 150 is sandwiched between the nut portion 122 formed on the distal end of the adjustment nut 120 and the joint 111. Accordingly, even when the buffer cover 150 is not fixed to the adjustment nut 120 by adhesion or the like, it is possible to prevent the removal of the buffer cover 150.

Figure 10:
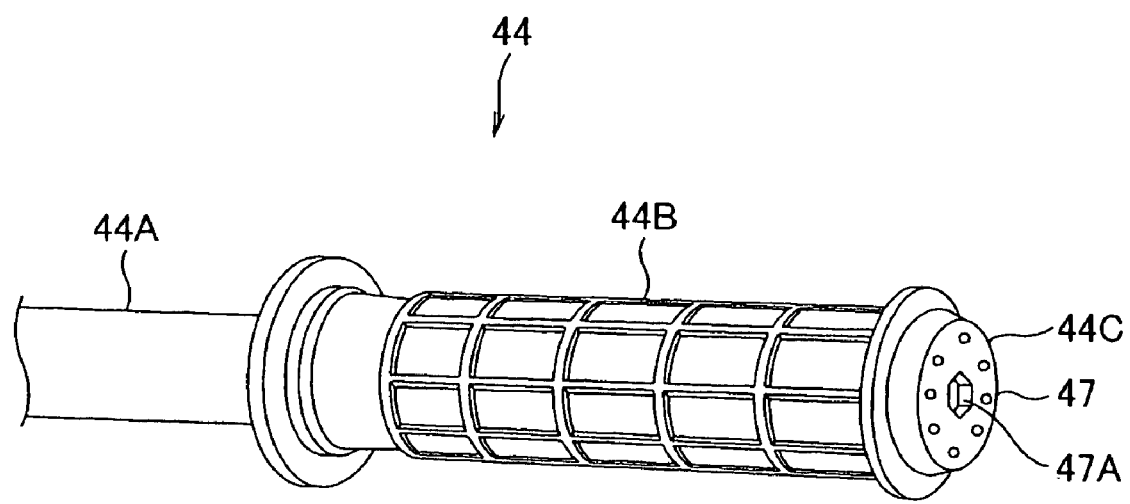
FIG. 10 is a perspective view of a handle.

FIG. 10 shows a handle 44 of the vehicle 10. The handle 44 includes a metal-made handle pipe 44A, a grip 44B which is fixed to both end portions of the handle pipe 44A, and a metal-made or resin-made end cap 44C which is mounted on both ends of the handle pipe 44A.

Figure 11B:
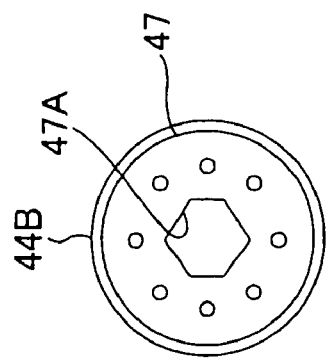
FIG. 11(b) is a view of the end cap mounting structure of the handle as viewed from an end-cap side.
Figure 11A:
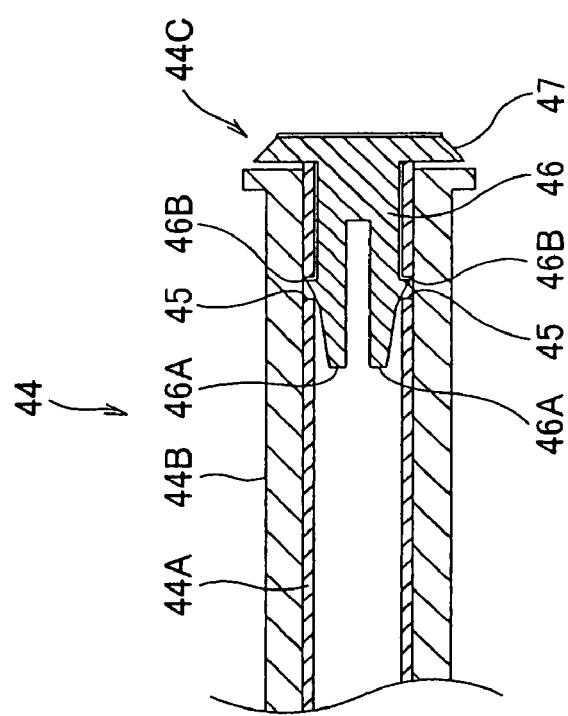
FIG. 11(a) is a cross-sectional view showing the end cap mounting structure of a handle.
Figure 11C:
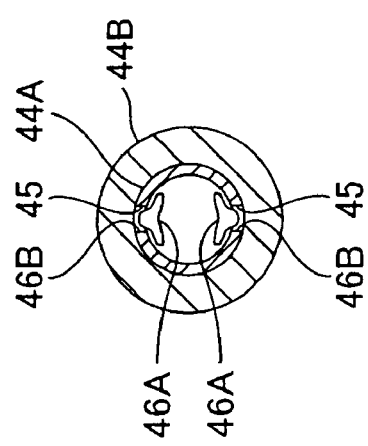
FIG. 11(c) is a view of the end cap mounting structure of the handle as viewed from a side opposite to the end cap.

FIG. 11(a) is a cross-sectional view showing the end cap mounting structure of the handle 44, FIG. 11(b) is a view obtained by viewing FIG. 11(a) from the end cap 44C side (right side), and FIG. 11(c) is a view obtained by viewing FIG. 11(a) as viewed from a side opposite to the end cap 44C (left side). As shown in these drawings, a plurality of (two in this example) engaging holes 45, 45 is formed in a region of the handle pipe 44A to which the grip 44B is fixed by adhesion or the like in a spaced-apart manner in the circumferential direction of the pipe 44A (at an interval of 180 degrees in this example).

The end cap 44C is integrally formed of an insertion portion 46 which is inserted into the handle pipe 44A and a flange portion 47 having a diameter larger than a diameter of the insertion portion 46, wherein the insertion portion 46 includes a pair of distal end portions 46A, 46A which extends to a side opposite to the flange portion 47 in a state wherein the distal portions 46A, 46A are spaced apart from each other. Outer peripheral surfaces of the distal end portions 46A, 46A are formed into an inclined surface which is inclined more inwardly as the outer peripheral surfaces extend toward tip ends of the distal end portions 46A, 46A, and in outer peripheries of proximal end portions of the distal end portions 46A, 46A, engaging members 46B, 46B which are engageable with the above-mentioned engaging holes 45, 45 formed in the handle pipe 44A are respectively formed. Further, an approximately hexagonal hole portion 47A is formed in an outer side surface of the flange portion 47.

In assembling the end cap 44C, when the end cap 44C is pushed into the inside of the handle pipe 44A using the pair of distal end portions 46A, 46A as a leading end, the pair of distal end portions 46A, 46A is inserted into the inside of the handle pipe 44A while being resiliently deformed. When the end cap 44C is rotated after inserting the end cap 44C into the inside of the handle pipe 44A until the flange portion 47 of the end cap 44C is brought into contact with an end surface of the handle pipe 44A, the engaging members 46B, 46B of the end cap 44C respectively engage the engaging holes 45, 45 of the handle pipe 44A. Thus, the end cap 44C is fixed to the handle pipe 44A. More specifically, with such an easy operation that the end cap 44C is rotated after being inserted into the inside of the handle pipe 44A, the end cap 44C can be fixed to the handle pipe 44A. By mounting the end cap 44C on the handle pipe 44A, it is possible to prevent the removal of the grip 44B by the flange portion 47 of the end cap 44C.

Further, the hexagonal hole portion 47A is formed in the flange portion 47 of the end cap 44C. Thus, by making use of such a hole portion 47A, the end cap 44C can be easily rotated using an L-shaped hexagonal rod wrench. Due to such an operation, the above-mentioned operation for engaging the engaging members 46B, 46B of the end cap 44C with the engaging holes 45, 45 formed in the handle pipe 44A can be easily performed and, at the same time, when the end cap 44C is rotated from such an engaging state, the engagement between the end cap 44C and the handle pipe 44A is released thus facilitating the removal of the end cap 44C.

Figure 12:
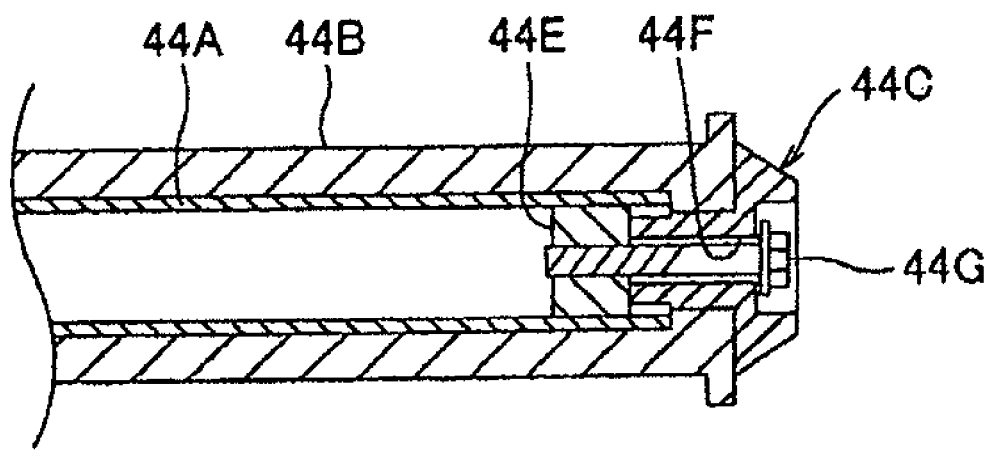
FIG. 12 is a view showing the end cap structure of a conventional handle.

FIG. 12 is a reference view showing the end cap structure of a conventional handle 440. As shown in the drawing, in the conventional handle 440, a nut 44E is preliminarily fixed to the inside of a handle pipe 44A, and a bolt 44G is inserted into a bolt hole 44F formed in an end cap 44C and is fastened to the above-mentioned nut 44E. Such a constitution requires an operation to fix the nut 44E to the handle pipe 44A and, at the same time, the construction requires the nut 44E and the bolt 44G. Thus, the number of parts is increased whereby the construction is disadvantageous in terms of reducing the of cost.

To the contrary, according to an embodiment of the invention, although the operation for forming the engaging hole 45 in the handle pipe 44A becomes necessary, such an operation can be more easily performed than the operation for fixing the nut 44E to the inside of the handle pipe 44A and, at the same time, such an operation requires neither the nut 44E nor the bolt 44G. Thus, the number of parts can be reduced and the mounting operation and the removal operation of the end cap 44C are facilitated.

As has been explained above, according to the embodiment, in the manipulation lever connection structure which connects the wire 103 which extends from the manipulation lever 101 to the arm 132 of the driving changeover lever 102 for operating the driving changeover device 100, the adjustment bolt 110 is mounted on the distal end of the wire 103, the joint 111 is slidably mounted on the adjustment bolt 110 on the axis of the adjustment bolt 110, and the adjustment nut 120 which supports the joint 111 is fastened to the adjustment bolt 110. The pair of side plate portions 133, 133, which respectively form the elongated holes 135, 135 which allow the joint 111 to pass therethrough, is mounted on the arm 132. The adjustment nut 120 is inserted between the pair of side plate portions 133, 133, and the buffer cover 150 is mounted on the adjustment nut 120 with the clearance formed between the adjustment nut 120 and the respective side plate portions 133, 133. Accordingly, it is possible to eliminate the generation of a striking sound by the buffer cover 150 even when the adjustment nut 120 vibrates due to vibrations of a vehicle body while avoiding a friction loss between the adjustment nut 120 and the arm 132.

Further, the head portion of the adjustment nut 120 is formed into the hexagonal nut portion 122 having a diameter larger than the diameter of the shaft portion 121, and the buffer cover 150 covers the shaft portion 121. Thus, the buffer cover 150 is sandwiched between the nut portion 122 and the joint 111 whereby the removal of the buffer cover 150 can be prevented even when the buffer cover 150 is not fixed by adhesion or the like. Further, a fastening quantity of the adjustment nut 120 can be easily adjusted by the above-mentioned nut portion 122.

Although the invention has been explained in conjunction with one embodiment heretofore, it is apparent that the invention is not limited to such an embodiment. For example, although the case in which the buffer cover 150 is formed of the vinyl tube is explained in the above-mentioned embodiment, the invention is not limited to such a case. In short, it is sufficient that the buffer cover 150 is formed of an impact buffer member which can reduce a striking sound. For example, the buffer cover 150 may be made of a resilient material such as rubber or sponge. Further, although the case in which the invention is applied to the manipulation lever connection structure of the ATV (All Terrain Vehicle) has been explained in the above-mentioned embodiment, the invention is not limited to such a case and is broadly applicable to the manipulation lever connection structure of a saddle-type vehicle or the like other than the ATV.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manipulation lever connection structure for a vehicle including an arm for operating a driving changeover device configured to change over a driving state between two-wheel drive mode and four-wheel drive mode, and for connecting a wire extending from a manipulation lever to the arm, comprising:
   an adjustment bolt mounted on a distal end of the wire;
   a joint slidably mounted on the adjustment bolt on an axis of the adjustment bolt; and
   an adjustment nut for supporting the joint, said adjustment nut being fastened to the adjustment bolt;
   a pair of joint support plate portions each having an elongated shaped hole formed therein for allowing the joint to pass therethrough; and
   wherein when the manipulation lever is moved in a first direction in order to move the arm from an initial position to a second position, the driving changeover device is changed to the four-wheel drive mode, and while the driving changeover device remains in the four-wheel drive mode, and the manipulation lever is moved in a second direction opposite to the first direction, the arm remains in the second position, and
   wherein the adjustment nut is inserted between the pair of joint support plate portions, and an impact buffer member is mounted on the adjustment nut with a clearance formed between the adjustment nut and the elongated shaped holes of the respective joint support plate portions,
   wherein joint support plate portions are substantially flat and are parallel to each other.

2. The manipulation lever connection structure for a vehicle according to claim 1, wherein a head portion of the adjustment nut has a hexagonal shape, a shaft portion of the adjustment nut is formed into a cylindrical shape having an outer diameter smaller than an outer diameter of the head portion of the adjustment nut, and the impact buffer member is mounted on the shaft portion.

3. The manipulation lever connection structure for a vehicle according to claim 1, wherein the wire includes an outer tube and an inner wire, said outer tube being operatively connected to a lever support bracket, said inner wire being connected to the adjustment bolt.

4. The manipulation lever connection structure for a vehicle according to claim 3, and further including a return spring operatively mounted between the joint and an end portion of the outer tube.

5. The manipulation lever connection structure for a vehicle according to claim 3, wherein the elongated shaped holes in the pair of joint support plate portions permit the inner wire to be moved relative thereto without an excessive force that would deflect the inner wire.

6. The manipulation lever connection structure for a vehicle according to claim 1, wherein the joint has an approximate columnar shape and is axially, slidable mounted relative to said adjustment bolt.

7. The manipulation lever connection structure for a vehicle according to claim 6, wherein the adjustment nut is fastened to said adjustment bolt for adjusting the position of the joint relative thereto.

8. The manipulation lever connection structure for a vehicle according to claim 1, wherein the impact buffer member is a buffer cover operatively mounted for covering substantially the entire adjustment bolt and forming the clearance relative to the pair of joint support plate portions.

9. The manipulation lever connection structure for a vehicle according to claim 8, wherein the clearance is formed between the buffer cover and the adjustment bolt wherein no friction loss occurs between the adjustment bolt and the arm for operating the driving changeover device.

10. The manipulation lever connection structure for a vehicle according to claim 1, wherein the joint support plate portions are portions of the arm which is a flat material bent in an approximately rectangular shape to form a space (S),
    wherein the wire passes though the space (S) with the joint support plate portions being on opposite sides thereof.

11. A manipulation lever connection structure for use with an arm for operating a driving changeover device configured to change over a driving state between two-wheel drive mode and four-wheel drive mode, and for connecting a wire extending from a manipulation lever to the arm, comprising:
    an adjustment bolt secured to a distal end of the wire;
    a joint slidably mounted on the adjustment bolt on an axis of the adjustment bolt; and
    an adjustment nut for supporting the joint, said adjustment nut being fastened to the adjustment bolt;

a pair of flat joint support plate portions arranged substantially parallel to each other, each of the joint support plate portions having an elongated-shaped hole formed therein for allowing the joint to pass therethrough; and wherein when the manipulation lever is moved in a first direction in order to move the arm from an initial position to a second position, the driving changeover device is changed to the four-wheel drive mode, and while the driving changeover device remains in the four-wheel drive mode, and the manipulation lever is moved in a second direction opposite to the first direction, the arm remains in the second position, and wherein said adjustment bolt being inserted between the pair of joint support plate portions, and opposite ends the joint pass through the elongated-shaped hole formed in each of the joint support plate portions; and an impact buffer member being mounted on the adjustment nut with a clearance formed between the adjustment nut and the elongated shaped holes of the respective joint support plate portions.

12. The manipulation lever connection structure for use with an arm according to claim 11, wherein a head portion of the adjustment nut has a hexagonal shape, a shaft portion of the adjustment nut is formed into a cylindrical shape having an outer diameter smaller than an outer diameter of the head portion of the adjustment nut, and the impact buffer member is mounted on the shaft portion.

13. The manipulation lever connection structure for use with an arm according to claim 11, wherein the wire includes an outer tube and an inner wire, said outer tube being operatively connected to a lever support bracket, said inner wire being connected to the adjustment bolt.

14. The manipulation lever connection structure for use with an arm according to claim 13, and further including a return spring operatively mounted between the joint and an end portion of the outer tube.

15. The manipulation lever connection structure for use with an arm according to claim 13, wherein the elongated shaped holes in the pair of joint support plate portions permit the inner wire to be moved relative thereto without an excessive force that would deflect the inner wire.

16. The manipulation lever connection structure for use with an arm according to claim 11, wherein the joint has an approximate columnar shape and is axially, slidable mounted relative to said adjustment bolt.

17. The manipulation lever connection structure for use with an arm according to claim 16, wherein the adjustment nut is fastened to said adjustment bolt for adjusting the position of the joint relative thereto.

18. The manipulation lever connection structure for use with an arm according to claim 11, wherein the impact buffer member is a buffer cover operatively mounted for covering substantially the entire adjustment bolt and forming the clearance relative to the pair of joint support plate portions.

19. The manipulation lever connection structure for use with an arm according to claim 18, wherein the buffer cover is made of a vinyl material for suppressing the generation of a striking sound when the buffer cover contacts the pair of joint support plate portions.

20. The manipulation lever connection structure for use with an arm according to claim 11, wherein the joint support plate portions are portions of the arm which is a flat material bent in an approximately rectangular shape to form a space (S), wherein the wire passes though the space (S) with the joint support plate portions being on opposite sides thereof.

* * * * *